United States Patent
Jain et al.

(10) Patent No.: US 8,072,882 B1
(45) Date of Patent: Dec. 6, 2011

(54) METHOD AND APPARATUS FOR A GRACEFUL FLOW CONTROL MECHANISM IN A TDM-BASED PACKET PROCESSING ARCHITECTURE

(75) Inventors: Naveen K. Jain, San Jose, CA (US); Venkata Rangavajjhala, Fremont, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 65 days.

(21) Appl. No.: 12/358,865

(22) Filed: Jan. 23, 2009

(51) Int. Cl.
H04L 12/26 (2006.01)
G06F 15/16 (2006.01)
G06F 13/24 (2006.01)

(52) U.S. Cl. ......... 370/230; 709/230; 710/260

(58) Field of Classification Search ......... 370/229–232; 709/230–232, 212; 710/5, 6, 260–262, 267
See application file for complete search history.

(56) References Cited

U.S. PATENT DOCUMENTS 6,377,998 B2 * 4/2002 Noll et al. ............ 370/230
7,546,446 B2 * 6/2009 Henry et al. ......... 710/262

* cited by examiner

*Primary Examiner* — Aung S Moe
*Assistant Examiner* — Kerri Rose
(74) *Attorney, Agent, or Firm* — James M. Wu; JW Law Group

(57) ABSTRACT

A method and apparatus for improving packet processing employing a network flow control mechanism are disclosed. A network process, in one embodiment, suspends distribution of incoming packet(s) to one or more, packet processing engines ("PEs") upon detecting a stalling request. After identifying currently executing operations initiated by one or more kicking circuits before the issuance of stalling request, the process allows the currently executing operations to complete despite the activation of the stalling request.

22 Claims, 7 Drawing Sheets

US 8,072,882 B1

METHOD AND APPARATUS FOR A GRACEFUL FLOW CONTROL MECHANISM IN A TDM-BASED PACKET PROCESSING ARCHITECTURE

FIELD

The exemplary embodiment(s) of the present invention relates to communications network. More specifically, the embodiment(s) of the present invention relates to packet processing.

BACKGROUND

A high-speed network environment typically includes network devices such as routers and switches that facilitate delivery of information packets from source devices to destination devices. Information pertaining to the transfer of information packet(s) through the network is usually embedded within one or more packets. Each information packet traveling through a network can typically be treated independently from other packets in a packet stream. For example, each router within a network processes incoming packets and determines where the packet(s) should be forwarded. For a modern computing network environment, in addition to 'deterministic' packet processing, the speed of packet processing can be critical in determining the performance of overall network system. TDM (Time Division Multiplexing) architectures are commonly used to guarantee deterministic packet processing within a network element.

To manage a network flow or control flow in a communications network element, a halt or stall of flow control can occur when one operation needs additional time to complete its task. When a processing component initiates a stalling request within a TDM architecture, various different processing elements may be at different stages of data processing. In addition, all processing elements typically need to be stalled gracefully thereby they can resume later at correct location and time.

A conventional approach to handle a stall in a communications network element is to stop all processing elements, including pipelines. All intermediary data and system controls are subsequently stored in a temporary memory thereby the processing can late be restored when the stalling request is deactivated.

A drawback associated with the conventional approach, however, is that storing and fetching intermediary data can consume time as well as memory space. Another drawback associated with the conventional approach is wasted executions time because some processing tasks are stopped in the middle of their execution in response to the stalling request.

SUMMARY

A method and apparatus for improving packet processing employing a graceful flow control mechanism are disclosed. A network process, in one embodiment, suspends distribution of incoming packet(s) to one or more packet processing engines ("PEs") upon detecting a stalling request. After identifying currently executing operations initiated by one or more kicking circuits before the issuance of stalling request, the process allows the currently executing operations to complete despite the detection of the stalling request.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
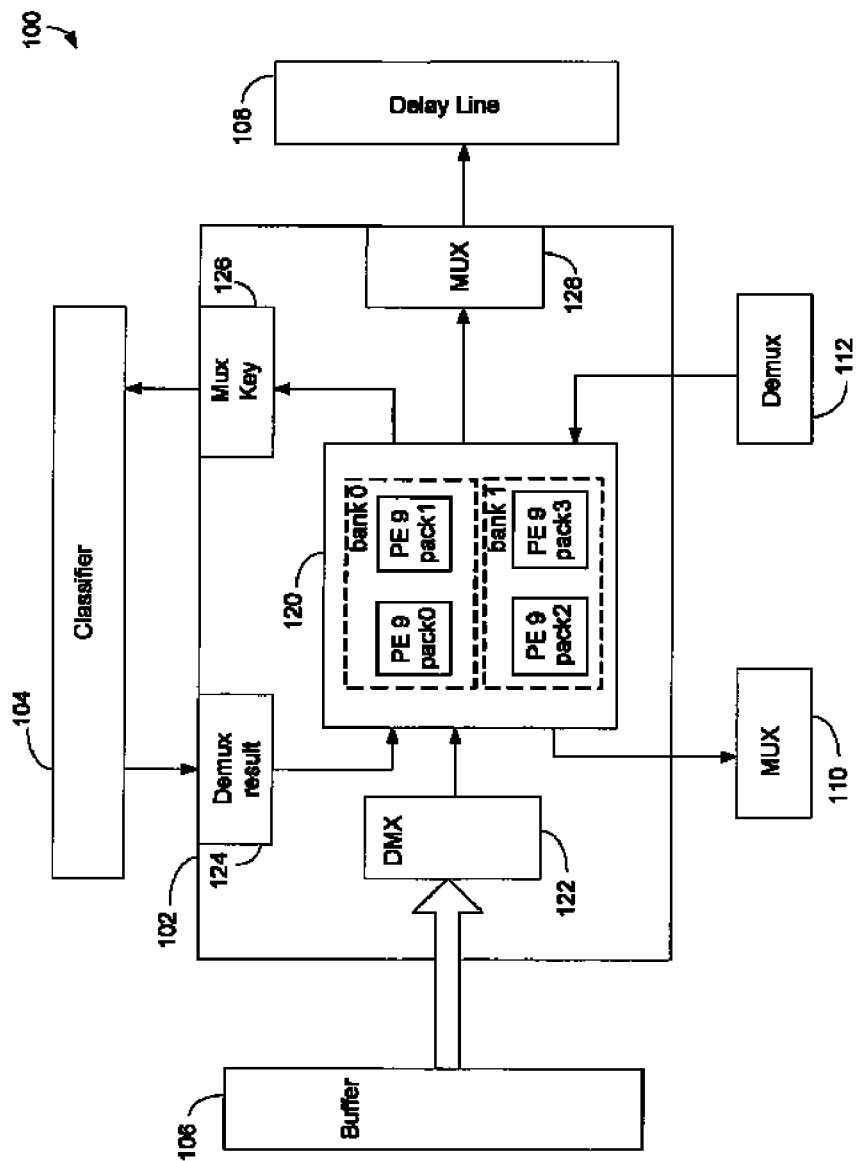
FIG. 1 is a block diagram illustrating a network processing device having multiple processing engines in accordance with one embodiment of the present invention.

Embodiment(s) of the present invention is described herein in the context of a method, device, and apparatus for improving packet processing with enhanced flow control mechanism during a stalling request.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skills in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A flow control mechanism having various kicking components capable of improving packet processing efficiency is disclosed. A network process, in one embodiment, suspends distribution of incoming packet(s) to one or more packet processing engines ("PEs") upon detection of a stalling request. After identifying currently executing operations, which are initiated by one or more kicking components before the issuance of stalling request, the process allows the currently executing operations to complete despite the detection of the stalling request.

FIG. 1 is a block diagram 100 illustrating a network processing device having multiple processing engines in accordance with one embodiment of the present invention. Diagram 100 includes a network processor 102, a buffer 106, a classifier 104, and a delay line 108. Additional multiplexer ("Mux") 110 and demultiplexer ("Demux") 112 may be used to connect to additional digital network processor(s). It should be noted that the underlying concept of the exemplary embodiment(s) of the present invention would not change if one or more blocks were added to or removed from diagram 100.

Network processor 102 can also be referred to as parallel vector processor, parallel processing engine, packet processing chip, network processing device, digital processing, device, and the like. Processor 102, in one embodiment, includes Demuxs 122-124, Muxs 126-128, and a processing unit 120, in which processing unit 120 further includes multiple banks of individual processing elements. For example, bank 0 contains a pack 0 and a pack 1 while bank 1 includes a pack 2 and a pack 3. Each pack, in one aspect, includes nine (9) processing engines ("PEs"), wherein each PE is configured to have one or more kicking components or circuits used for flow control, especially during a stalling request. The terms "pack" and "bank" may be used interchangeably thereinafter. Processor 102 may also include additional processing unit(s) and/or additional bank(s) to enhance its computing capacities. It should be noted that the underlying concept of the exemplary embodiment(s) of the present invention would not Change if one or more PEs were added to or removed from packs 0-3.

While DEMUX 122 is used to communicate with buffer 106, Mux 128 is employed to couple to delay line 108. Processor 102 further uses Mux 126 to access a Content Addressable Memory ("CAM") with a lookup key via classifier 104 and employs Demux 124 to receive result data from classifier 104. Processor 102, in one aspect, can be fabricated in a single die, and alternatively, it can be fabricated into multiple dies or combined with other functional circuitry.

Buffer 106, which is also known as receiving buffer, stores packets received by input port or ports of a router. Received packets generally stay in a queue before they are scheduled for processing. Buffer 106, in one embodiment, is capable of distributing or scheduling packet(s) to various available PEs for packet processing. Buffer 106 can also be back-pressured to prevent it from forwarding any additional packets if PEs are busy. Depending on the application, buffer 106 is capable of storing and/or forwarding multiple bytes of data every clock cycle. For example, buffer 106 can forward thirty-two (32) bytes of data to Demux 122 every clock cycle.

Classifier 104, also known as packet classification, is to categorize a packet or packets according to a set of predefined rules. To enhance line rate at a high speed information transmission, a classification lookup table is used to assist routing packet(s) from input ports to output ports. The classification lookup table includes multiple entries storing predefined results in accordance with header values. In one embodiment, the classification lookup table uses a CAM to match a packet with a result, which indicates how to route the packet. Processor 102 provides a lookup key to classifier 104 via Mux 126, and subsequently receives a result from classifier 104 via Demux 124. Upon receipt of the routing result, processor 102 forwards the packet to delay line 108. It should be noted that depending on the information being transferred by the packet, it may take anywhere from one (1) to four (4) lookup cycles for identifying an index in the CAM in accordance with the lookup key. Each lookup cycle, in one aspect, lasts around 300 clock cycles.

Delay line 108 is a memory, a shift register, a first-in first-out ("FIFO") register, and/or any other types of memory devices. The size of memory capacity for delay line 108 can vary depending on the maximum lookup cycles allowed for each packet processing, number of PEs, and speed of arriving packets. Delay line 108, in one embodiment, is used to guarantee that the packets exiting a router have the same sequence as the packets entering the router. Delay line 108 further allows the content of a stored packet to be updated or rewritten in response to the content of a processed packet. An advantage of using a delay line is to improve throughput of PEs. It should be noted that packets which get classified early come out of PE early and thus are not in the same order in which they entered PEs. Delay line 108 allows and assists PEs' to process more packets.

Diagram 100 shows an aspect of a processing device capable of handling multiple packets at the same time. For example, when an input port of the packet processing device receives a packet header, which for instance composes 192 bytes of packet control information, the packet processing device distributes the header to an available PE to determine where the packet should be routed. If a system data bus, which is situated between buffer 106 and processing unit 120, is a 256-bit or 32-byte-wide bus, 192 bytes of header information should take six (6) clock cycles for the bus to transfer a complete packet header to processing unit 120. It should be noted that if processing unit 120 contains 36 PEs capable of processing packets under a TDM environment, each PE may complete a packet approximately every 216 clock cycles. In other words, the system data bus is capable of receiving and transferring 32 bytes per clock cycle, and the entire header having 192 bytes requires six (6) clock cycles to transfer.

Processing unit 120 for example includes four (4) packs organized in two banks wherein each pack includes nine (9) PEs. With 36 PEs having parallel processing capability, 36 packets can be processed simultaneously. Since time needed to transfer 36 packets from input ports is 216 (36 packets×6 cycles=216) clock cycles, the $37^{th}$ packet arrives and is ready to be processed after 216 clock cycles. In one embodiment, processing unit 120 is configured to process or rout a packet every 216 clock cycles provided that the maximum number of lookup cycle is two (2). In the event that more than two (2) lookup cycles are required, the network processing stalls. It should be noted that processing stalls affect overall network performance.

Each PE, in one embodiment, includes a flow control mechanism, which further contains one or more kicking circuits, kicking modules, and/or kicking firmware for handling various flow controls related to halt scenarios such as stalls and/or interrupts. A kicking circuit, not shown in FIG. 1, may also be referred to as an initiating circuit, starting component, et cetera, and is used to kick off a logic function, such as a CAM access or a packet output. If an operation is kicked off by a kicking circuit, the operation is going to complete its task(s) regardless of whether a stalling request is subsequently issued or not. In other words, when a stalling request is activated, a logic operation started before the activation of the stalling request is going to finish its operation. Similarly, the operations, which are waiting to be kicked off, will be suspended as soon as a stalling request is detected.

An advantage of employing a flow control mechanism is to enhance packet processing efficiency and minimize hardware deployment because processing pipelines and operations are not required to stop immediately when a stalling request is detected. It should be further noted that massive temporary storage for storing stage information for various state machines is not required because, state machines and pipelines in the middle of processing are allowed to finish their tasks.

Figure 2:
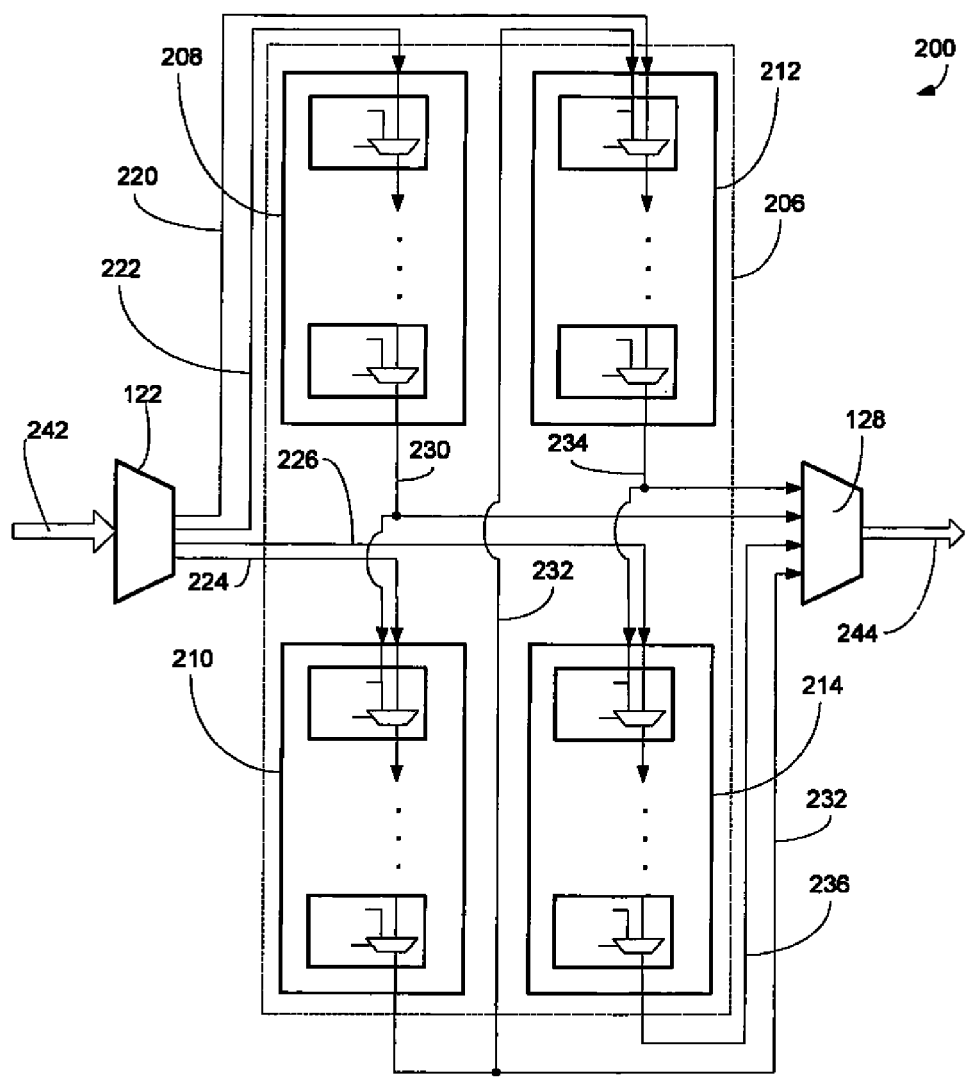
FIG. 2 is a block diagram illustrating a network processor having multiple processing engines capable of implementing flow control mechanism in accordance with one embodiment of the present invention.

FIG. 2 is a block diagram 200 illustrating a network processor having multiple processing engines capable of implementing flow control mechanism in accordance with one embodiment of the present invention. Diagram 200 includes a network processor or a processing device 206, a Demux 122, and a Mux 128, wherein processing device 206 further includes four (4) banks or packs of PUs, packet-processing-engines ("PPEs"), or PEs 208-214. The terms "bank" and "pack" can be used interchangeably hereinafter. An advantage of organizing PUs or PPEs into a multi-banks configuration is to improve latency. Ultimately, each design has to trade off routing congestion with packet latency and arrive at the right balance. For example, instead of receiving output packets from the last PE in bank 214 via bus 236, Mux 128 can receive output packets directly from banks 208-214 via bus 230-236.

Each bank may include multiple PEs, such as nine. (9), sixteen (16), thirty-two (32), sixty-four (64), and so on. It should be noted that the number of PE does not have to be in power of 2. Banks 208-214, in one embodiment, are interconnected in a daisy chain configuration via buses 220-236. For example, a packet stream can travel from bank 208 to bank 210 via bus 230 and then continue to travel from bank 210 to bank 212 via bus 232. After bank 212, the packet, stream proceeds from bank 212 to bank 214 through bus 234. It should be noted that Mux 128 can capture output data from buses 230-236 instead of waiting for the data to travel through the entire daisy chain.

Demux 122, in one aspect, is capable of distributing four packet streams to inputs of four banks 208-214 via buses 220-226. Mux 128 is configured to receive four output packet streams from four banks 208-214 via buses 230-236. For example, Demux 122 uses buses 220-226 to distribute input data packets to banks 208-214. Upon receipt of output data packets from buses 230-236, Mux 128 generates an output packet stream in accordance with the output data packets, and subsequently, transmits the output packet stream to external devices via bus 244. To increase system performance, PEs of banks 208-214 can process data in parallel.

Referring back to FIG. 2, each bank includes a sequence of PEs connected in a daisy chain structure. PEs can also be referred to as digital processing units, processors, central processing units, vector processors, microprocessor, embedded processors, and the like. A daisy chain or sequence of PEs is organized in such a way that the output of a PE is fed to the input of the next PE in the sequence. It should be noted that the input of the first PE of every bank is connected to Demux 122 and the output of the last PE of each bank is connected to Mux 128.

Diagram 200, in one embodiment, includes a global clock tree that is used to distribute clock signals to various components including every PE in each bank. Each PE in a bank is assigned a designated time frame for data accessing. It should be noted that some PEs have the same designed tithe frames. Alternatively, a unique designated time frame is assigned to each PE. In another embodiment, the clock stamp(s) distributed by the clock tree is encoded in the packet stream whereby each PE can verify time accurately.

In operation, upon receipt of data packets over bus 242, Demux 122 is capable of decomposing the data packets to form four separate packet streams. Four packet streams are subsequently sent to banks 208-214 using buses 220-226. After arrival of the packet streams, PEs in each bank process the packet stream in accordance with the designated time frames. It should be noted that packet stream may carry data packets for input as well as for output when it travels through the bank. Mux 128 collects output packet streams from banks 208-214 via buses 230-236 and combines output packet streams to form an output stream, which is subsequently sent to external devices via bus 244.

The daisy-chain-interconnect architecture using multiple banks configuration can result in reduced die sizes, fast clock cycles, and power conservation. It should be noted that diagram 200 may include more than four (4) banks. For example, diagram 200 can have eight (8) banks, sixteen (16) banks, thirty-two (32) banks, and so on. The number of banks employed is not necessary to have a 2-power number. It should be noted that when a packet is being kicked off at the beginning of daisy chain and its destination is the last PE of the daisy chain, the flow control mechanism allows the packet to travel through 34 PEs despite the issuance of stalling request.

Figure 3:
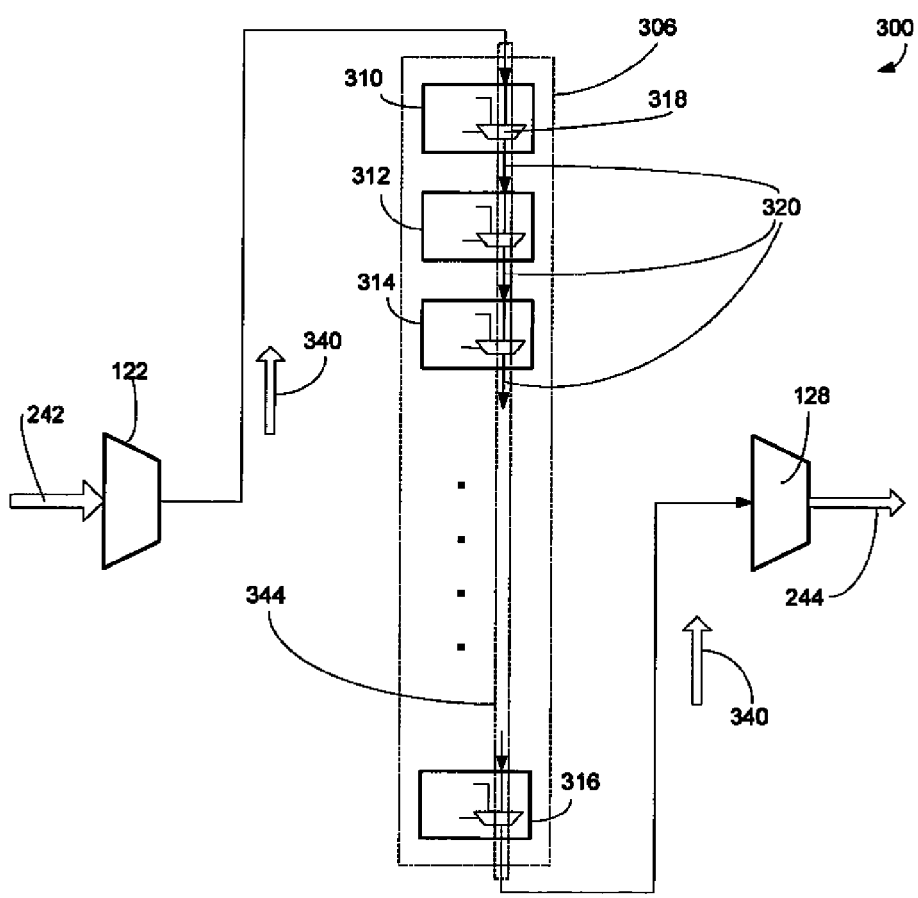
FIG. 3 a block diagram illustrating a processing system having multiple PEs configured in a daisy chain structure or a sequence 306 in accordance with one embodiment of the present invention.

FIG. 3 is a block diagram illustrating a processing system 300 having multiple PEs 310-316 configured in a daisy chain structure or a sequence 306 in accordance with one embodiment of the present invention. Processing system 300, which can also be referred to as a parallel processor system or a vector parallel processing system, has a daisy-chain-interconnected architecture. System 300 includes a Demux 122, a Mux 128, and multiple processing units 310-316. It should be noted that the underlying concept of the embodiment(s) of the present invention would not change if one or more blocks (circuit or circuitries) were added to or removed from system 300.

Referring back to FIG. 3, sequence 306 includes multiple digital processing units or PEs 310-316 arranged in a daisy chain or series configuration. Digital processing units 310-316 can also be referred to as processing units, processors, central processing units, vector processors, microprocessors, embedded processors, packet-processing-engines, and the like. Multiple digital processing units 310-316 may include any number of processors, such as eight (9), sixteen (16), thirty-two. (32), sixty-four (64), and so on. Sequence 306, for example, arranges digital processing units in a daisy chain or sequence whereby the output of digital processing unit 310 is fed to the input of digital processing unit 312; the output of digital processing unit 312 is fed to the input of digital processing unit 314; and so on until a daisy chain is formed. The digital processing unit located at the beginning of the sequence may be called the first digital processing unit while the digital processing unit located at the end of the sequence is referred to as the last digital processing unit.

Demux 122 is a data distribution device and is coupled to digital processing unit 310 for distributing data streams from external devices to system 300. Demux 122 is configured to receive a data stream from an external device via bus 302, not shown in FIG. 3, and subsequently passes the data Stream to sequence 306 without processing or reformatting the data stream. Alternatively, Demux 122 converts or reformats data stream(s) from bus 242 to a packet stream 340 before it is being transmitted. Mux 128 is also a data distribution device and is coupled to a digital processing unit 316 of sequence 306. In one embodiment, Mux 128 receives packet stream 340 from digital processing unit 316 and passes it to an external device, not shown in FIG. 3, via bus 330 without reformatting Alternatively, Mux 128 reformats data packets carried by packet stream 340 and forwards reformatted stream(s) to the external device(s) via bus 244.

Packet stream 340, in one embodiment, includes multiple data packets, which could further be divided into input data packets, and output data packets. Packet stream 340 is capable of traveling through sequence 306 via a conduit 344. Conduit 344, in one embodiment, passes through every digital processing unit in sequence 306, and becomes an integral part of each digital processing unit. Alternatively, conduit 344 is in sequence 306 but it does not physically travel through each digital processing unit.

System 300, in one embodiment, includes a global clock tree configured to distribute clock signals to various components including digital processing units or PEs 310-316. System 300 further includes a controlling device, which is responsible to assign designated time frames. Each digital processing unit, in one embodiment, is assigned a designated time frame for data accessing to and from packet stream 340. The time frame is a predefined period of time duration in accordance with clock signals. For example, a time frame can be a period of two nanoseconds. A designated time frame is a period of duration with a specific starting time and ending time. System 300, in one embodiment, uses designated time frames to control which digital processing unit can access the data packets carried by packet stream 340. It should be noted that some digital processing units have the same designed designated time frames while other digital processing units have unique designated time frames. In one embodiment, a clock stamp(s) is encoded in the header of each packet stream 340, whereby each digital processing unit can verify time accurately.

PEs or digital processing units 310-316, in one embodiment, include circuitry 318 and buses 320 to control when and how packet stream 340 passes through these units. For instance, circuitry 318 in digital processing unit 310 determines whether unit 310 should write a data packet to packet stream 340 before passing packet stream 340 to digital processing unit 312. Instead of using designated time frames, other addressing means such as special identification numbers ("IDs") encoded in each packet stream or each data packet may be used for data accessing.

During an operation, upon receipt of data packets via bus 242, Demux 122 reformats data packets to a transmission protocol used by packet stream 340 and then sends packet stream 340 to sequence 306. It should be noted that packet stream 340, for example, should contain similar information as data packets from bus 242. Packet stream 340, in one embodiment, includes many data packets, which is capable of crossing boundaries of multiple digital processing units. For example, when a datapacket in packet stream 340 arrives at unit 310 from Demux 122, unit 310 passes the data packet to unit 312 if the time frame is not the designated time frame for unit 310. Alternatively, if the time frame is the designated time frame for unit 310, it writes to or reads from a data packet(s) carried or transported by packet stream 340. A digital processing unit, for example, may write and read data packets from packet stream 340 at the same designated time frame. It should be noted that when packet stream 340 travels through conduit 344, it may contain both input data packets as well as output data packets. After receipt of data packets carried by packet stream 340 from unit 316, Mux 128 outputs the data packets via bus 244.

An advantage of having a processing system arranged in a sequence or a daisy chain configuration is to alleviate routing congestion. For example, by adopting the daisy-chain-interconnect architecture, the on-chip routing congestion should be reduced. Accordingly, a daisy-chain-interconnect architecture of a parallel processing system enhances computing performance with reduced die size.

Figure 4:
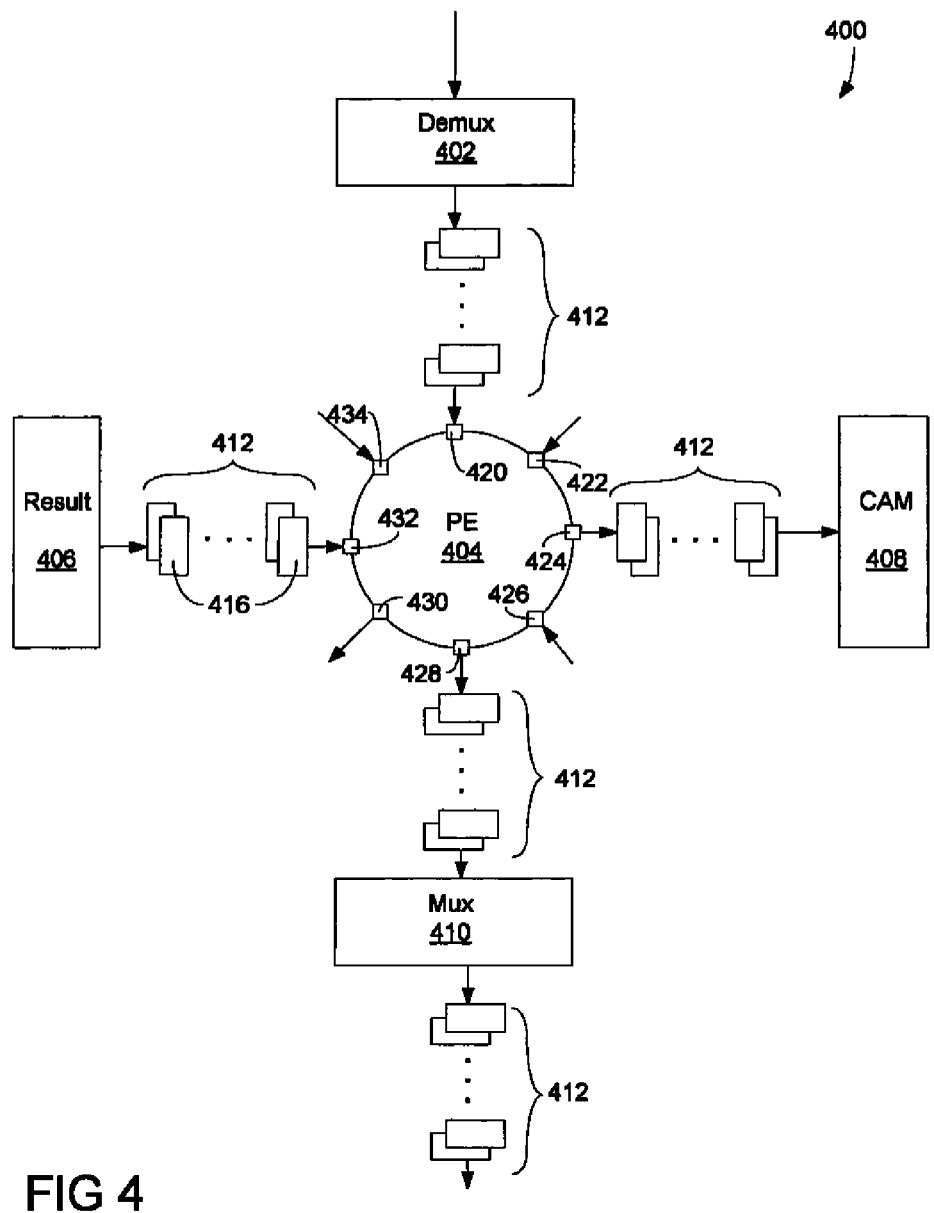
FIG. 4 is a block diagram illustrating a packet processing engine having a flow control mechanism in accordance with one embodiment of the present invention.

FIG. 4 is a block diagram 400 illustrating a packet processing engine 404 having a flow control mechanism in accordance with one embodiment of the present invention. Diagram 400 includes a Demux 402, a PE 404, a result memory 406, a CAM 408, and a Mux 410. Diagram 400 further includes multiple delays, or latch delays or flip-flop delays 412 indicating a time delay between two components such as two PEs in a daisy chain. It should be noted that the underlying concept of the embodiment(s) of the present invention would not change if one or more blocks (circuit or circuitries) were added to or removed from diagram 400.

The flow control mechanism of PE 404 includes multiple kicking circuits or components 420-434 and latch delays 412. Kicking circuits 420-434 can also include kicking modules, kicking firmware, or a combination of software and hardware components used for handling network flow control. A function of flow control mechanism is to manage network data flow including stalls and/or interrupts. Kicking circuits 420-434 can be multiple individual components or are combined into a single component capable of performing multiple kicking functions. For example, kicking circuit 424 is used to kickoff a lookup access to CAM 408 via latch delay 412. The flow control mechanism, in one embodiment, manages flow control handling multiple PEs in a TDM environment. Diagram 400 could have multiple PEs such as 36 PEs, but for simplicity, diagram 400 only illustrates a single PE 404.

Latch delay or flip-flop delay 412 includes multiple individual latches or flip-flops 416 wherein each flip-flop represents one block delay. Block delay, also known as a component delay or instruction cycle delay, may include multiple clock cycles. In one aspect, block delay dictates number of clock cycles that a component has to complement its task. For example, a component needs to process the data and latches the result of processing before the end of the block delay. To maintain data integrity, data or any information is required to be latched before the end of every block delay. For example, if a packet data originated from the first PE of a daisy chain is forwarded the last PE of the daisy chain, the packet data needs to pass 34 PEs assuming it is a 36-daisy chain and needs to be latched 34 times as well. Depending on the application, a PE may latch processed or partially processed data several times within the component delay 412.

The processing device, in one aspect, includes 36 engines or PEs capable of working under a TDM network environment. Referring back to FIG. 4, upon receipt of a packet header, Demux 402 forwards the packet via various components indicated by delay 412. The packet is subsequently demultiplexed to an available engine as such PE 404 for packet processing. When the packet processing is completed, the packet is queued or pipelined as indicated by latch delay 412 before it is forwarded or multiplexed to an external network device via Mux 410.

In one example, after determining a lookup key, it is queued or pipelined as indicated by latch delay 412 before it is kicked off traveling to CAM 408. The result value from result memory 406 may also required to travel through several components indicated by delay 412 before it reaches to PE 404. It should be noted that depending on the application and the nature of data packets, time delay indicated by latch delay 412 can vary based on number of components or blocks situated between a source component and a destination component. For instance, a sequence number may be queued before it comes into PE 404 and goes out to PE 404. It should be noted that latency of packet or any other data coming into an engine can be different based on the location of PE with respect to the daisy chain of engines. While each processing element or component may have different functions to perform within allotted time, each function starts with a kick originated by a kicking component. PE 404 is capable of performing various functions or operations, such as incoming packet processing, bit manipulation, CAM key build up, a sequence number check, CRC checksum, UDP checksum, CAM result processing and so on. Each function or operation of PE 404 has its own processing logic and pipeline. To avoid potential memory contention and/or register collision, a kicking circuit is used to kick off some functions while keeps other operations in a waiting queue until the current operation is completed. As such, flow control mechanism manages and monitors packet flows in a network traffic.

Upon detecting a stalling request, the flow control mechanism suspends packet processing while allows started operations, which are in middle of execution, to continue until they finish their designated tasks. For example, a stalling request can be activated by a CAM requesting additional time. When a lookup key is sent by PE 404, it is possible that CAM FIFO is full and it will flow control back to PE 404. One way to flow control is to disable pipeline stages and state machines. Functions or operations, which have already started, will continue until they finish all their functions despite the stalling request is actively asserted. It should be noted that the flow control does not travel to every functional block. In one aspect, a flow, control may reach a PE (or TDM sequencer) via the same pipeline stages, such as a daisy chain pipelined PEs. A packet, which is already in flight to an engine or a PE, will not be stopped. When the stalling request is active, the next or new packet will be suspended from traveling to PE until the stalling request is lifted or deactivated.

The flow control mechanism illustrated in FIG. 4 uses kicking circuits together with latch delays 412 to control data flow during a stall. Diagram 400 shows various delays 412 logically situated between PE 404, Demux 402, CAM 408, Mux 410, and result memory 406. While delay 412 between Demux 402 and PE 404 can represent other PEs situated from Demux 402 to PE 404, delay 412 between CAM 408 and PE 404 represents clock cycles needed to perform a lookup function. Similarly, delay 412 between PE 404 and Mux 410 may represent additional PEs situated from PE 404 to Mux 410 before a processed packet can be sent to an external network device. During a stalling request, the flow control mechanism, for instance, suspends sending any packets in the waiting queue immediately, while allows packets, which have already been started in execution, to complete their tasks. For example, upon detecting a stalling request, the flow control mechanism suspends forwarding any new packets from Demux 402 to PEs, and allows packets, which have already left Demux 402, to complete their tasks. Similarly, upon detecting a stalling request, kicking circuit 424 immediately suspends forwarding new lookup keys to CAM 408, and allows lookup key(s) in execution to reach CAM 408.

The flow control mechanism is applicable to TDM sequencers and permits individual functions, which are kicked off, to finish even though a stalling request is activated. As such, the volume of intermediary data for storage is reduced. When the stalling request is deactivated, the processing stage(s) immediately before the activation of stalling request is restored. The TDM wheel, for instance, will start at the same point before the occurrence of network stall.

Figure 5:
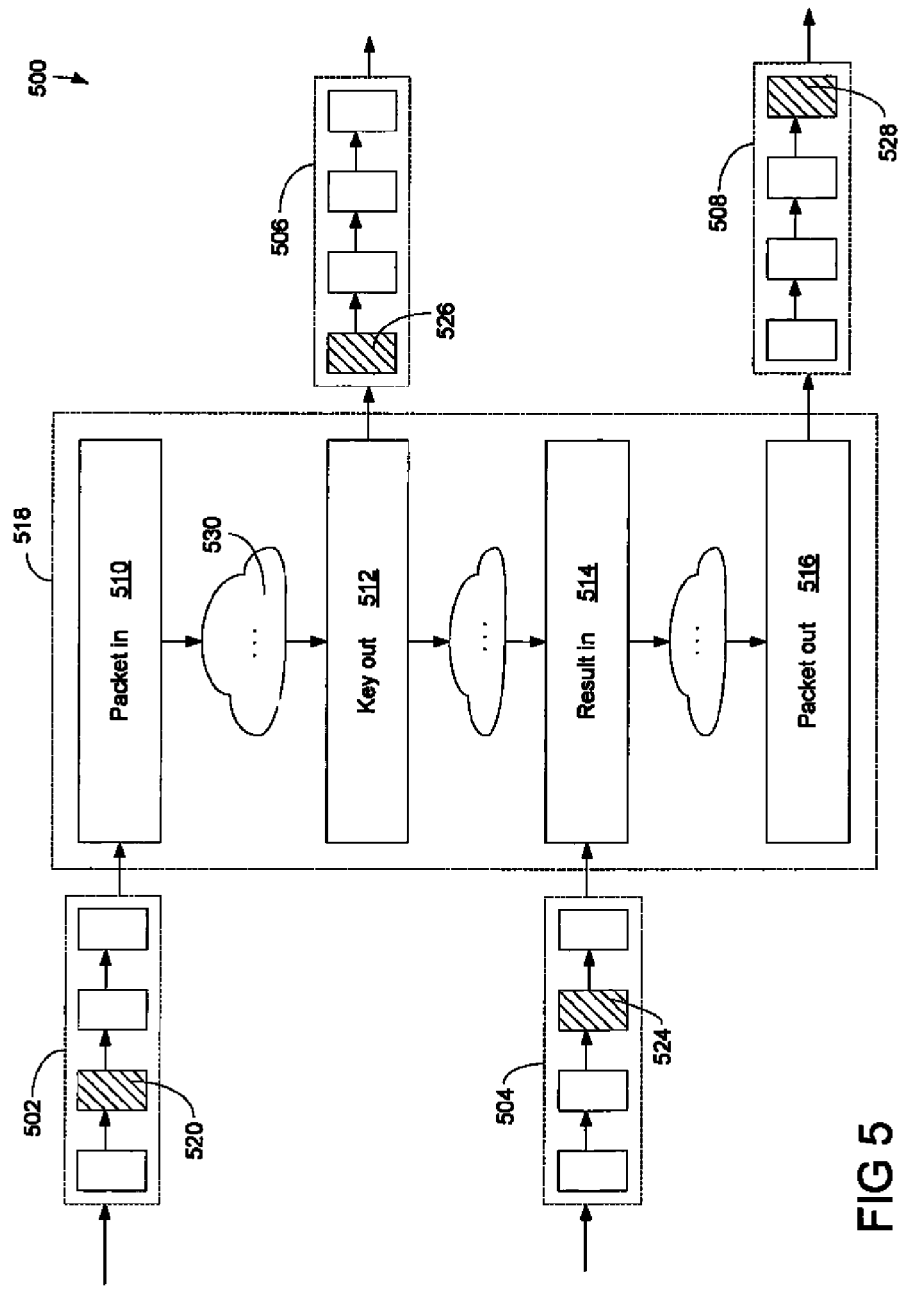
FIG. 5 is a logic diagram illustrating logic operations within a packet processing engine using a flow control mechanism in accordance with one embodiment of the present invention.

FIG. 5 is a logic diagram 500 illustrating logic operations within a packet processing engine using a flow control mechanism in accordance with one embodiment of the present invention. Diagram 500 includes multiple delays 502-508 and a PE 518, wherein PE 518 further includes various functions or operations such as packet-in 510, key-out 512, result-in 514, and packet-out 516. In one embodiment, the logic control flows in a sequence from packet-in 510, key-out 512, result-in 514, to packet-out 516. It should be noted that the underlying concept of the embodiment(s) of the present invention would not change if one or more blocks or operations such as block 530 were added to or removed from diagram 500.

Time delay, as described earlier, is a clock delay between two components and may include one or more component delays. Components, for example, include PEs, CAM, classifier, and so on. For example, for a 36-PE daisy chain, the delay between the first PE and the last PE can be at least 34 component delays. Time delays 502-508 include four (4) blocks wherein each represents a component delay. When the flow control mechanism detects a stalling request, a packet at block 520 of time delay 502 is allowed to reach packet-in 510 since the packet has already been started. Similarly, when a lookup key arrives at block 526 of time delay 506 after leaving key-out 512, the lookup key will be allowed to continue even though the lookup key needs to pass several blocks to reach the CAM. For the same reason, results at block 524 and processed packet at block 528 are allowed to proceed although a stalling request is asserted.

The exemplary embodiment(s) of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. In another embodiment, the steps of the exemplary embodiment of the present invention may be performed by specific hardware components that contain hard-wired logic for performing the steps, or by any combination of programmed computer components and custom hardware components.

Figure 6:
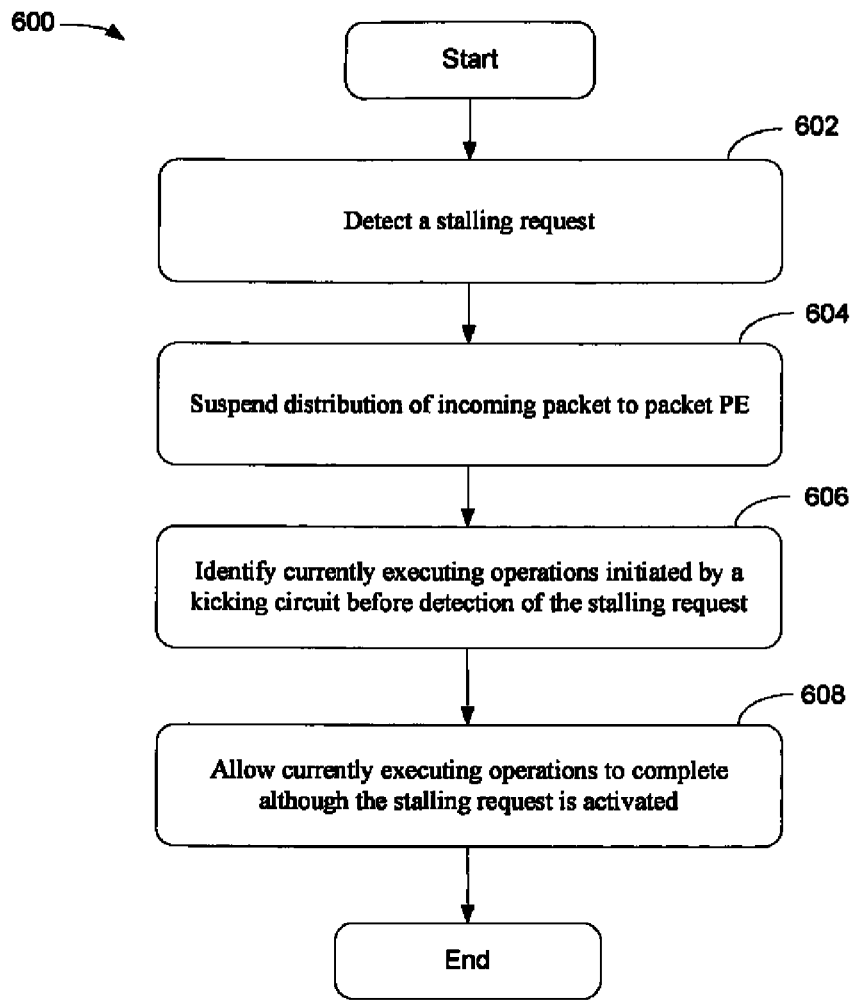
FIG. 6 is a flowchart illustrating a network flow control mechanism in accordance with one embodiment of the present invention.

FIG. 6 is a flowchart 600 illustrating a network flow control mechanism in accordance with one embodiment of the present invention. At block 602, a process of flow control mechanism detects a stalling request. The stalling request may be activated or issued by a classifier, which needs additional time to complete its current task. For example, the process receives a halting signal from a classifier indicating additional clock cycles needed for completing currently processing packet.

At block 604, the process is capable of suspending distribution of incoming packet to packet PEs. In one embodiment, the process receives incoming packets from one or more input ports and subsequently buffers incoming packets in a memory.

At block 606, the process is capable of identifying currently executing operations initiated by one or more kicking circuits before the detection of the stalling request. For example, the currently executing operations include a CAM lookup operation, a result processing operation, and/or a packet-out operation.

At block 608, the process is configured to allow currently executing operations to complete although the stalling request is activated. For example, the process is capable of determining an additional lookup cycle, which is needed to identify an index from a CAM, and activating the stalling request to obtain additional time. The process is further capable of identifying queued operations and/or packets that are waiting to be started by one or more kicking circuits. When the stalling request is detected, the queued operations are suspended immediately until the stalling request is deactivated. The process, in one embodiment, monitors the stalling request and resumes distribution of incoming packet to available PEs after the stalling request is deactivated.

Figure 7:
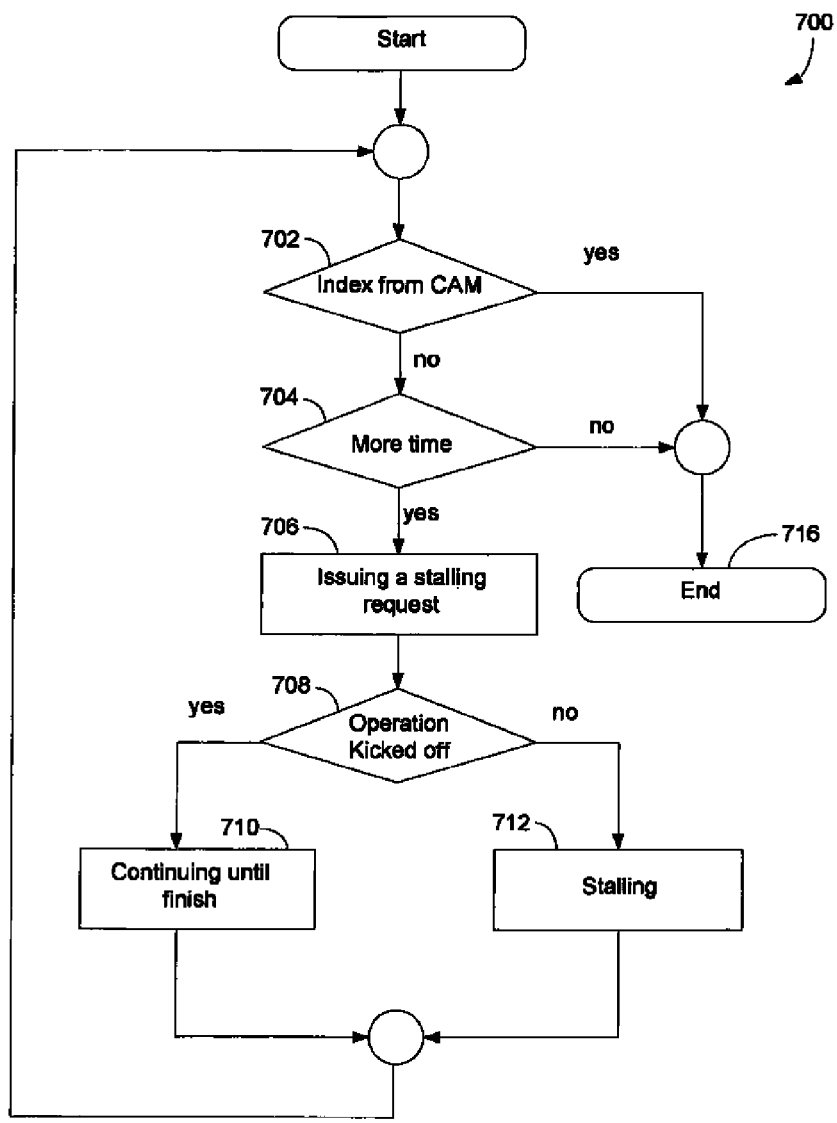
FIG. 7 is a flowchart illustrating an example of network flow control mechanism in connection with a classifier in accordance with one embodiment of the present invention.

FIG. 7 is a flowchart 700 illustrating an example of network flow control mechanism in connection with a classifier in accordance with one embodiment of the present invention. At block 702, the process exams whether an index is returned by a CAM in response to a lookup key during a classification procedure. If the index is returned, the process proceeds to block 716. Alternatively, if the index is not returned, the process proceeds to the next block.

At block 704, the process, examines whether the classifier has requested more time. If no additional time is requested, the process proceeds to block 716. On the other hand, the additional time, however, is requested, the process proceeds to the next block.

At block 706, the process issues a stalling request to stall the flow control until the current task is completed. It should be noted that the issuance of a stalling request can be activated by the classifier.

At block 708, the process identifies whether an operation or operations have been started or kicked off. The operation has been started indicating an operation is in the middle of execution. If the operation or Operations have been kicked off, the process proceeds to block 710. Otherwise, the process moves to block 712.

At block 710, the process allows the operation(s), which have been started and are in the middle of execution, to continue until they finish the tasks. For example, a lookup access will be allowed to continue if it is already started in execution. After block 710, the process loops back to block 702.

At block 712, the process stalls operations that have not been started yet. Some packets or operations may be queued in a buffer waiting to be kicked off and such packets or operations are being suspended until the stalling request is lifted or deactivated.

While particular embodiments of the present invention have been shown and described, it will be obvious to those skills in the art that based upon the teachings herein, changes and modifications may be made without departing from this exemplary embodiment(s) of the present invention and its broader embodiments. Therefore, the appended claims are intended to encompass within their scope all such changes and modifications as are within the true spirit and scope of this exemplary embodiment(s) of the present invention.

What is claimed is:

1. A method for packet processing, comprising:
   detecting a stalling request;
   suspending distribution of incoming packet transmitted across a communications network to one of a plurality of packet processing engines ("PEs") capable of routing packets;
   identifying a plurality of currently executing operations initiated by one or more kicking circuits before detection of the stalling request; and
   allowing the plurality of currently executing operations to complete although the stalling request is activated.

2. The method of claim 1, further comprising:
   determining an additional lookup cycle needed for determining an index from a content addressable memory ("CAM"); and
   activating the stalling request to obtain additional time.

3. The method of claim 2, further comprising:
   identifying a plurality of queued operations that are waiting to be started by one or more kicking circuits when the stalling request is detected; and
   suspending the plurality of queued operations until the stalling request is deactivated.

4. The method of claim 1, wherein detecting a stalling request further includes receiving a halt signal from a classifier indicating additional clock cycles needed for completing currently packet.

5. The method of claim 1, wherein suspending distribution of incoming packet further includes receiving the incoming packets from one or more input ports; and buffering the incoming packets in a memory.

6. The method of claim 1, wherein identifying a plurality of currently executing operations includes identifying a CAM lookup operation.

7. The method of claim 1, wherein identifying a plurality of currently executing operations includes identifying a result processing operation.

8. The method of claim 1, wherein identifying a plurality of currently executing operations includes identifying a packet out operation.

9. The method of claim 1, further comprising:
   monitoring the stalling request; and
   resuming distribution of incoming packet to packet PEs after the stalling request is deactivated.

10. A network processing device, comprising:
    a receiver capable of receiving packets over a communications network at a predefined packet flow rate; and
    a packet processing engine coupled to the receiver and configured to have a kicking circuit capable of initiating one or more logic operations relating to packet processing, wherein if a logic operation is initiated by the kicking circuit, the logic operation relating to packet processing is allowed to complete its operation even if a stalling request is subsequently detected.

11. The device of claim 10, further comprising a classifier coupled to the packet processing engine and capable of asserting the stalling request.

12. The device of claim 11, wherein the receiver includes a buffer capable of buffering incoming packets after detecting of the stalling request.

13. The device of claim 11, wherein the receiver includes a packet scheduler configured to suspend distributing packets to packet processing engine when the stalling request is activated.

14. The device of claim 10, wherein the kicking circuit is a logic circuit capable of launching a content addressable memory ("CAM") lookup operation.

15. The device of claim 10, wherein the logic operation includes a CAM lookup operation, checksum calculation, bitwise execution, and result processing operation.

16. The device of claim 10, wherein the predefined packet flow rate is 216 clock cycles per packet.

17. An apparatus having a network processor, a buffer, a classifier, and a delay line wherein the network processor includes a plurality of processing engines ("PEs") for packet processing, comprising:
 means for detecting a stalling request;
 means for suspending distribution of incoming packet transmitted across a communications network to one of the plurality of PEs capable of routing packets;
 means for identifying a plurality of currently executing operations initiated by one or more kicking circuits before detection of the stalling request; and
 means for allowing the plurality of currently executing operations to complete although the stalling request is activated.

18. The apparatus of claim 17, further comprising:
 means for determining an additional lookup cycle needed for determining an index from a content addressable memory ("CAM"); and
 means for activating the stalling request to obtain additional time.

19. The apparatus of claim 18, further comprising:
 means for identifying a plurality of queued operations that are waiting to be started by one or more kicking circuits when the stalling request is detected; and
 means for suspending the plurality of queued operations until the stalling request is deactivated.

20. The apparatus of claim 17, wherein means for detecting a stalling request further includes means for receiving a halt signal from the classifier indicating additional clock cycles needed for completing currently processing packet.

21. The apparatus of claim 17, wherein means for suspending distribution of incoming packet further includes means for receiving the incoming packets from one or more input ports; and means for buffering the incoming packets in a memory.

22. The apparatus of claim 17, wherein means for identifying a plurality of currently executing operations includes means for identifying a CAM lookup operation.

* * * * *

UNITED STATES PATENT AND TRADEMARK OFFICE
CERTIFICATE OF CORRECTION

| | | |
|---|---|---|
| PATENT NO. | : 8,072,882 B1 | |
| APPLICATION NO. | : 12/358865 | |
| DATED | : December 6, 2011 | |
| INVENTOR(S) | : Naveen K. Jain and Venkata Rangavajjhala | |

It is certified that error appears in the above-identified patent and that said Letters Patent is hereby corrected as shown below:

Title page, item (57):

In the ABSTRACT, line 4, delete "," .

Signed and Sealed this
Thirty-first Day of January, 2012

David J. Kappos
*Director of the United States Patent and Trademark Office*